United States Patent [19]
Montemayor et al.

[11] Patent Number: 5,494,398
[45] Date of Patent: Feb. 27, 1996

[54] UNSTACKING MACHINE AND METHOD

[75] Inventors: Ezequiel Montemayor, Palos Verdes Estates; Javier Aldrete, La Puente; Salvador Arello, Fontana, all of Calif.

[73] Assignee: Desarrollo Industrial y Tecnologico, S.A., Guadalupe, Mexico

[21] Appl. No.: 259,643

[22] Filed: Jun. 14, 1994

[51] Int. Cl.$^6$ ..................................................... B65G 59/04
[52] U.S. Cl. ............................ 414/797; 271/94; 271/112; 271/303
[58] Field of Search .......................... 414/795.8, 796.5, 414/796.7, 797; 271/9–9.01, 11, 12, 94, 108, 112, 158, 303

[56] References Cited

U.S. PATENT DOCUMENTS

| | | | |
|---|---|---|---|
| 2,112,309 | 3/1938 | Santillan | 33/5 |
| 2,570,374 | 10/1951 | Pompa . | |
| 2,603,143 | 7/1952 | Saenz | 99/353 |
| 2,773,442 | 12/1956 | Contreras | 99/404 |
| 3,080,079 | 3/1963 | Lecrone et al. | 214/309 |
| 3,148,876 | 9/1964 | Chandler et al. | 271/12 |
| 3,223,053 | 12/1965 | Jimenez et al. | 107/4 |
| 3,245,356 | 4/1966 | Jiminez et al. | 107/57 |
| 3,274,959 | 9/1966 | Jiminez et al. | 107/68 |
| 3,372,924 | 3/1968 | Treff | 271/12 |
| 3,467,029 | 9/1969 | Hayes | 107/1 |
| 3,570,393 | 3/1971 | Schy | 107/7.2 |
| 3,602,130 | 8/1971 | Perez | 99/404 |
| 3,667,372 | 6/1972 | Hilvitz et al. | 99/404 |
| 3,712,453 | 1/1973 | Hurst | 99/404 |
| 3,722,400 | 3/1973 | Jiminez | 99/353 |
| 3,785,273 | 1/1974 | Stickle | 99/404 |
| 3,928,638 | 12/1975 | Stickle | 426/439 |
| 3,954,260 | 5/1976 | Morello et al. | 172/12 |
| 3,955,812 | 5/1976 | Suda et al. | 271/303 |
| 4,006,831 | 2/1977 | Jimenez | 214/6 D |
| 4,037,801 | 7/1977 | Jinenez | 241/247 |
| 4,136,767 | 1/1979 | Sarovich | 198/689 |
| 4,160,043 | 7/1979 | Stickle et al. | 426/439 |
| 4,171,198 | 10/1979 | Jiminez et al. | 425/377 |
| 4,184,418 | 1/1980 | Jiminez | 99/353 |
| 4,189,504 | 2/1980 | Jiminez | 426/508 |
| 4,250,802 | 2/1981 | Rubio | 99/348 |
| 4,312,892 | 1/1982 | Rubio | 426/626 |
| 4,326,455 | 4/1982 | Rubio | 99/483 |
| 4,345,752 | 8/1982 | Nakamura et al. | 271/12 |
| 4,392,418 | 7/1983 | Jiminez | 99/330 |
| 4,447,052 | 5/1984 | Müller | 271/303 |
| 4,513,018 | 4/1985 | Rubio | 426/622 |
| 4,620,826 | 11/1986 | Rubio et al. | 414/73 |
| 4,703,924 | 11/1987 | Marass | 271/158 |
| 4,838,882 | 6/1989 | Klaeser et al. | 156/520 |
| 4,938,126 | 7/1990 | Rubio et al. | 99/349 |
| 5,074,547 | 12/1991 | Smith et al. | 271/283 |
| 5,088,717 | 2/1992 | Hamanaka et al. | 271/12 |
| 5,096,179 | 3/1992 | Scmitt | 414/795.8 |
| 5,118,515 | 6/1992 | Montemayor et al. | 426/128 |
| 5,195,741 | 3/1993 | Stauber | 271/303 |

Primary Examiner—Michael S. Huppert
Assistant Examiner—Douglas A. Hess
Attorney, Agent, or Firm—Eugene Chovanes

[57] ABSTRACT

A device as described for unstacking thin, flat articles, particularly flexible articles, and especially tortillas, from a stack of the same, which includes means for repetitively picking up the topmost tortilla in a stack and conveying it to a moving belt where it is deposited individually and separately and moved to a further processing operation. The pick up means includes a rotating cylinder having holes in its surface through which suction acts on the tortillas, to temporarily hold them to the cylinder, and belts around and rotating with the cylinder which transfer the tortillas from the cylinder to the moving conveyor.

11 Claims, 9 Drawing Sheets

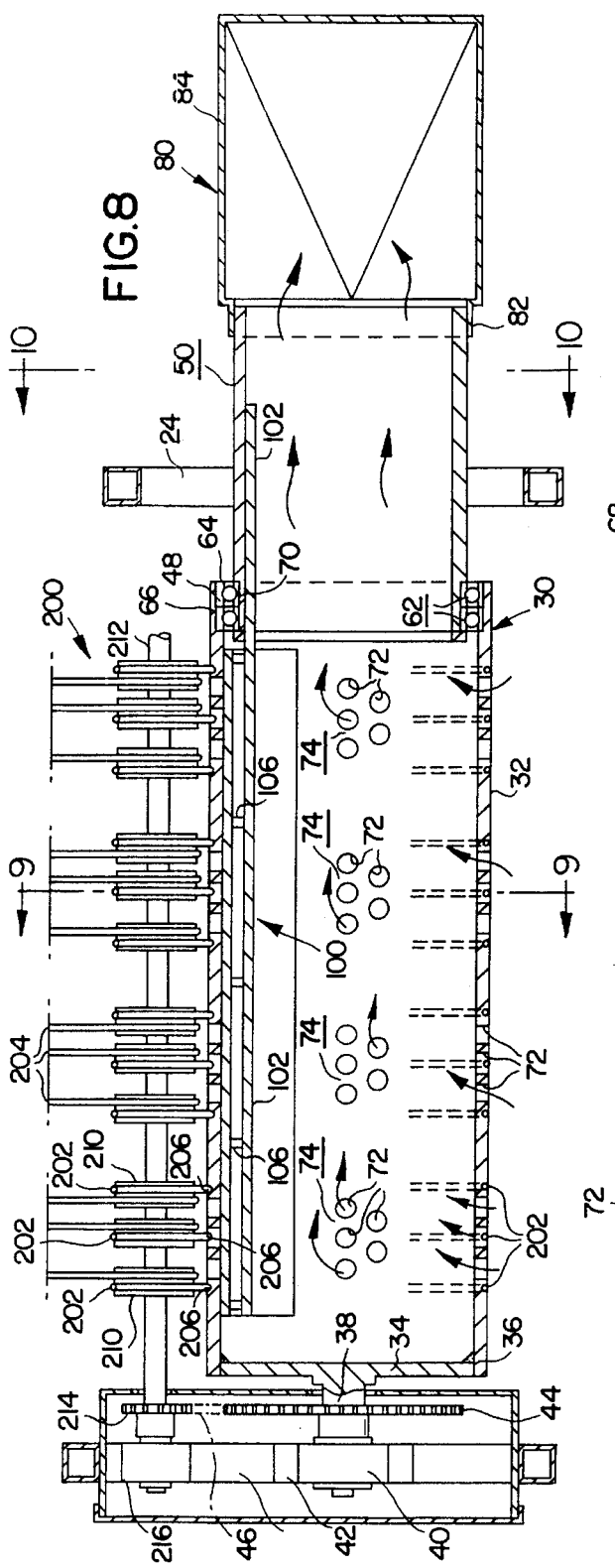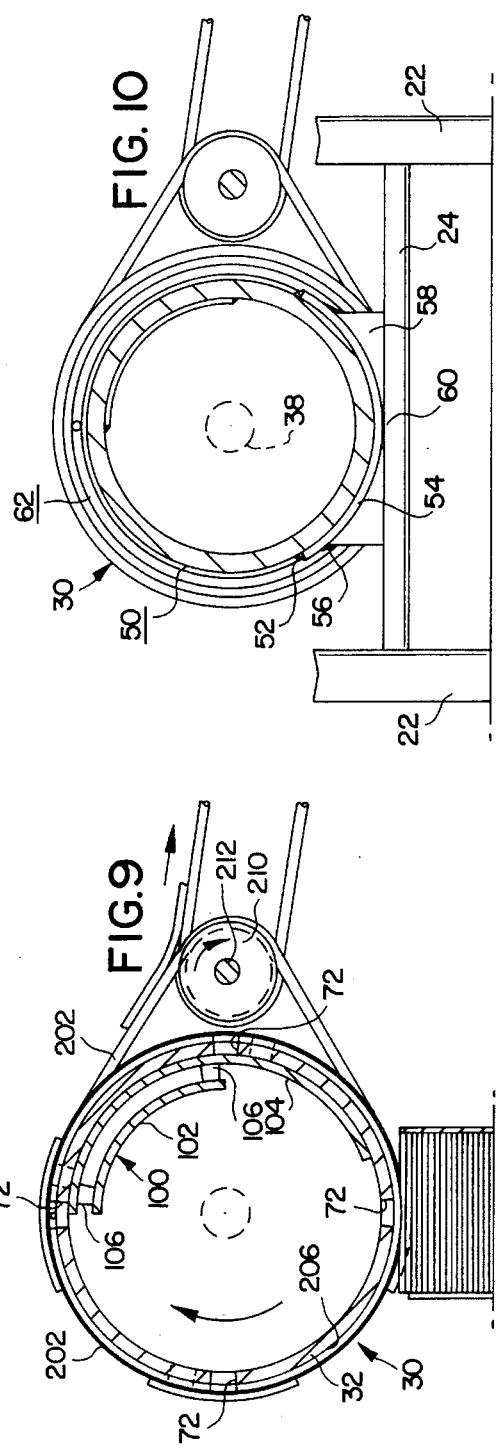

UNSTACKING MACHINE AND METHOD

BACKGROUND OF THE INVENTION

1. Field of the Invention

This invention relates generally to article handling and more specifically to an apparatus and method for unstacking articles with suction by removing the highest article first from a stack.

In the embodiment shown herein, the invention is used on an article of food, namely tortillas. Tortillas are unstacked and placed on a moving belt, spaced and separated from each other.

2. Prior Art

Certain articles of a flat, flexible form are stacked and then unstacked during their production or use. For instance, in the factory processing of tortillas, which are flat, flexible, relatively fragile rounds of baked unleavened dough, the tortillas are kept in stacked form, after baking; and cooling, for a given time period of repose to allow the moisture to migrate and be distributed evenly. The tortillas are then unstacked and separated before being further processed into, for instance, taco shells or tostadas.

It is with tortillas that the present invention will be herein disclosed, but the device and method taught herein can be used on other stacked articles that are flat and preferably, but not necessarily, flexible.

With tortillas, the stacking, which is generally automatic, occurs after the unleavened dough has been shaped into flat, round shapes of, for instance, 0.03" to 0.20" thick, and 4" to 14" in diameter, baked, and cooled. A typical stack has 12 tortillas. U.S. Pat. Nos. 4,006,831; 4,938,126 and 5,118,515, among others, discuss such tortilla processing and stacking and are incorporated herein by reference.

Where the stacks are individually packaged and then distributed for use by the ultimate consumer, no further factory processing occurs.

In other instances, however, the tortillas continue to be factory processed; for instance, into taco shells or tostadas, by passing the tortillas in spread-out form, separate from one another, on a moving metallic belt, through a vat of hot oil, as shown for instance in U.S. Pat. No. 4,184,418.

Such stacking and repose, prior to further factory processing, is necessary to redistribute the moisture within the tortilla and allow the moisture to migrate uniformly throughout the tortilla. The tortilla, after coming through the baking process and before stacking, is relatively dry on the surface. Without distributing the moisture evenly throughout the tortilla, blistering within the tortilla occurs when the tortilla is submerged into the hot oil. The pockets of moisture rapidly expand under the influence of the heat in the oil.

Such stacking and period of rest, or repose, during which the stack of tortillas may or may not be shrink-wrapped, can extend from 45 minutes to two hours or more.

In the prior art, the stacks of tortillas were then manually separated one by one and placed on a moving belt. Generally, at least two people were needed on a feed line, and their output was relatively limited. For instance, two people could feed approximately 800 lbs. of tortillas per hour. With the present invention, one person operating the machine can teed 1150 lbs. of tortillas per hour. In terms of actual tortillas, 27,600 tortillas per hour can be handled by the machine shown and described herein.

The present invention repetitively and continuously takes the topmost tortillas from a stack and moves it to a moving belt, so the tortillas are separate from one another. The belt moves the tortillas on for further processing, for instance to produce a taco shell or a tostada.

SUMMARY OF THE INVENTION

With the device of the invention, flat, flexible, stacked articles, including food products such as tortillas, are automatically spread out on a moving surface. An article is repetitively lifted from the top of a stack and carried to a moving surface where the article is placed separate from others.

The device has a horizontal rotating drum with a cylindrical wall having a series of holes through the wall. A vacuum is formed within the cylinder, creating suction at the holes.

Stacks of tortillas are positioned vertically below, and fed upwardly toward, the cylinder. As the holes in the cylinder successively pass over the topmost tortilla in each stack, the tortillas are individually sucked against and held to the cylinder and individually spaced thereon. As the drum rotates, a stationary blade positioned within the cylinder, in close proximity to its inner wall, over the portion of the cylinder that is moving downwardly in its rotary motion, cuts off the vacuum to the holes. This releases the tortilla from any substantial suction and permits the tortilla to be carried away on moving belts and deposited on a moving surface, spaced from any other tortilla.

A feed mechanism with dual magazines permits one magazine to be manually filled with stacks and moved into position after the other magazine has been emptied.

An optional diverter mechanism permits the unstacked tortillas to be alternatively fed to an upper and lower belt where two such belts are used for further processing of the tortilla, as by passing through a vat of cooking oil.

BRIEF DESCRIPTION OF THE DRAWINGS

FIG. 8 is an enlarged fragmentary sectional plan view taken on the line 8,8 of FIG. 2, showing details of the rotary dram.

FIG. 9 is a slightly enlarged fragmentary sectional elevational view taken on the line 9,9 of FIG. 8.

FIG. 10 is a fragmentary sectional elevational view taken on the line 10,10 of FIG. 8, showing additional details of construction.

DETAILED DESCRIPTION

Figure 1:
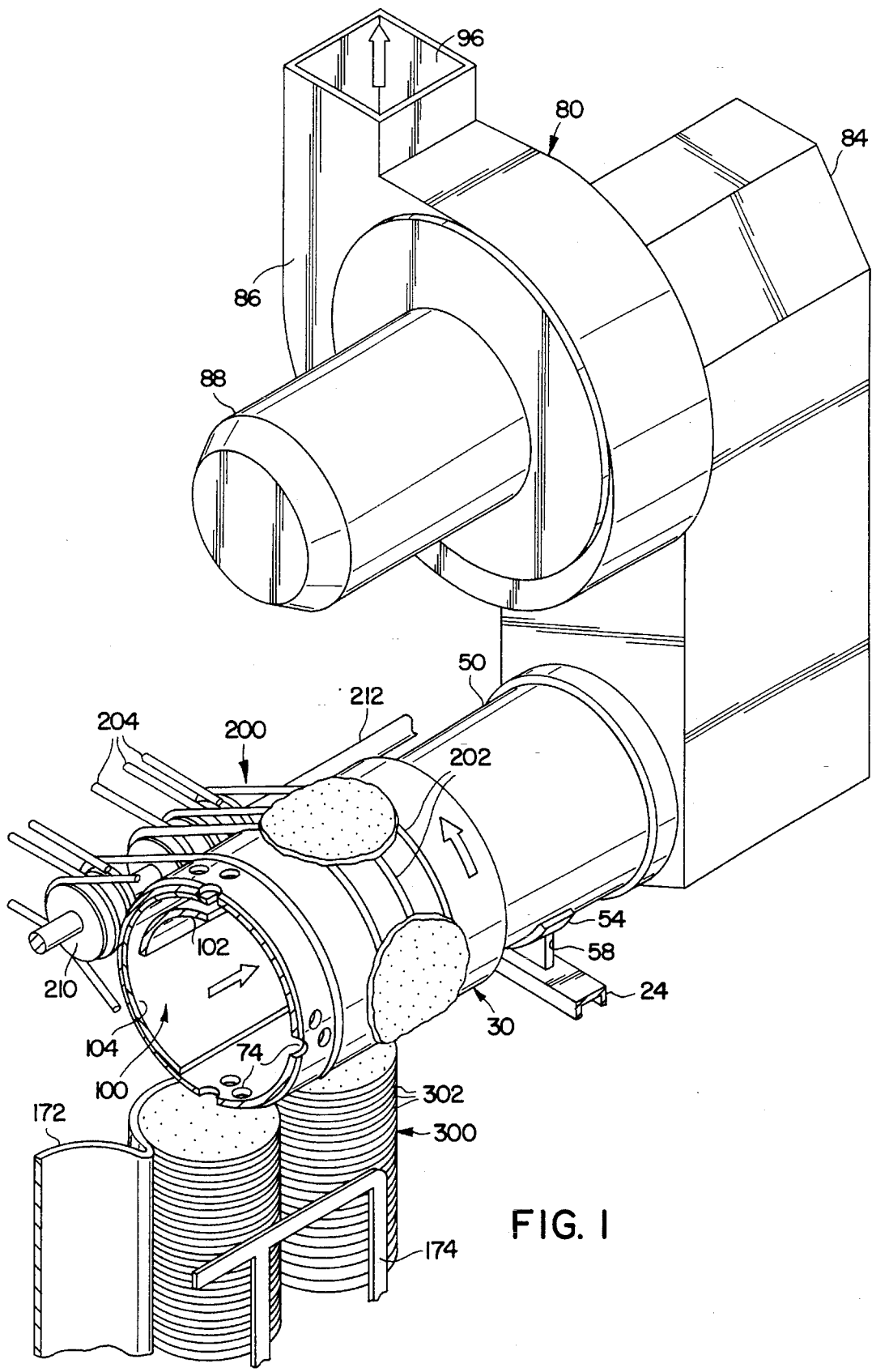
FIG. 1 is a fragmentary isometric semischematic view of the rotary drum and suction fan of the invention with articles lifted from the stack and held on the surface of the drum.

The device of the invention comprises generally main frame 20, rotating drum 30, suction fan assembly 80, suction cutoff mechanism 100, feed mechanism 110, takeoff belt assembly 200, and optionally, diverter assembly 250.

The main frame 20 comprises uprights 22 and horizontal members 24. The frame may be composed of square cross-sectional tubes or other suitable light structural elements that can be joined by welding, riveting, bolting or the like.

The main frame 20 forms a boxlike structure and is mounted on casters 26 which can be suitably locked and unlocked for optional movement into or out of a production line or other work site. The casters 26, four in number, support the entire structure of the invention and the various aspects thereof.

Figure 2:
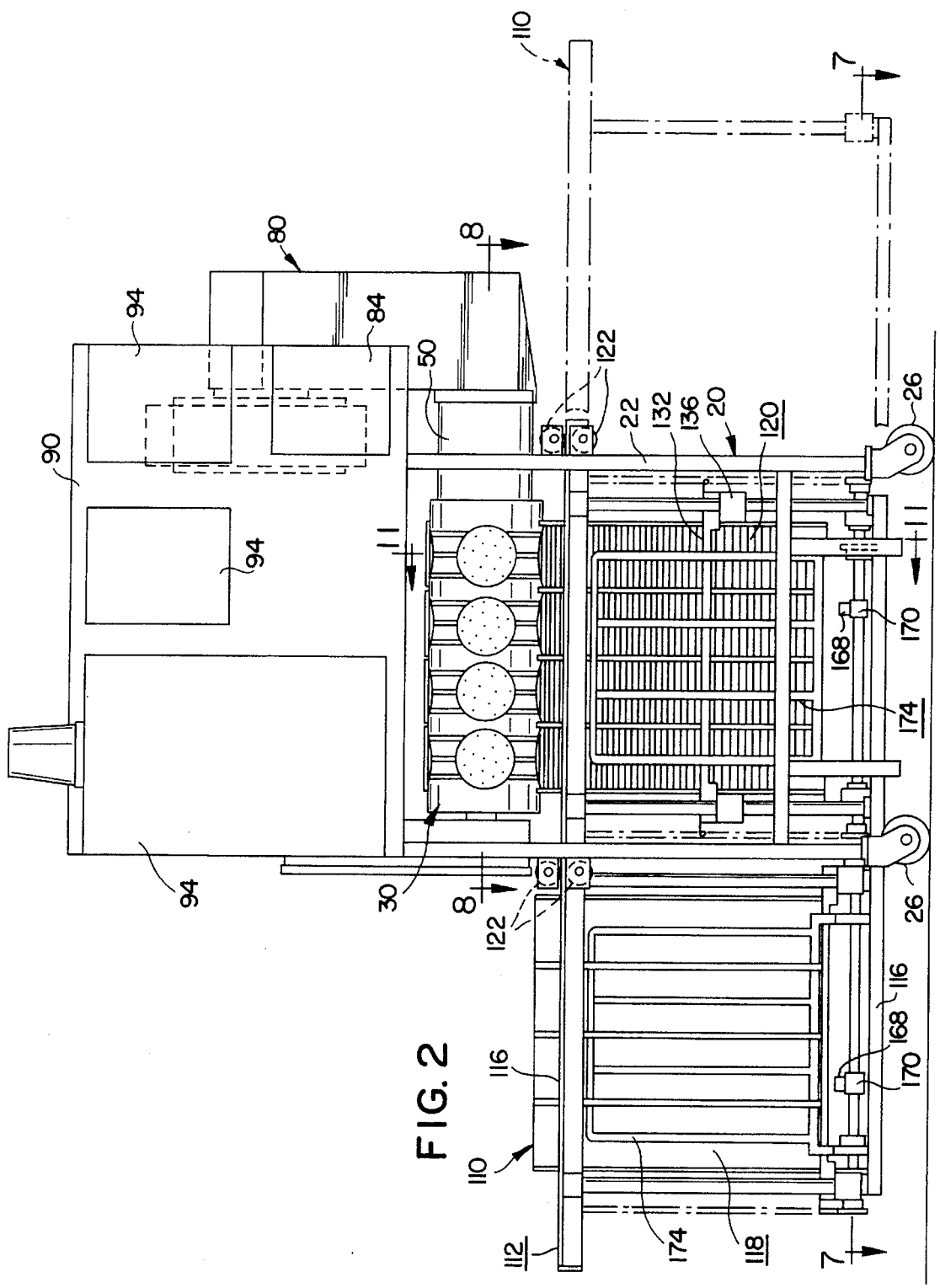
FIG. 2 is a front or operator's elevational view of the device of the invention. The feed mechanism is shown in full line in one limit position and in broken line outline in its other limit position.

Journalled on the frame 20 as best seen in FIGS. 2 and 8 is a rotating drum 30. The drum has a cylinder wall 32 of approximately 11" in diameter and 28" in length. The drum is desirably of stainless steel of, for instance, a ½" thickness. As viewed particularly in section in FIG. 8, the drum 30 at the left side is closed by integral end cap 34 being welded or otherwise sealed to cylinder wall 32 at the circumference 36. A shaft 38 welded into the center of end cap 34 extends into bearing block 40. Bearing block 40 is supported on cross member 24 at location 42. Sprocket 44, keyed on shaft 38, is of the well known tooth type which engages a roller chain 46. The opposite end of drum 30 is journalled at 48 on a fixed hollow open-ended cylinder 50. Cylinder 50 as seen in FIG. 10 is welded at 52 into saddle 54 which in turn is welded at 56 into support block 58. Support block 58 in turn is welded or otherwise secured to frame member 24 at location 60.

Open-ended cylinder 50 journals drum 30 through ball bearing 62 at location 64. The outer race 66 of bearing 62 is fixed in the end of drum 30 at 64 by a forced fit or other means. The inner race of bearing 62 is fixed on fixed hollow open-ended cylinder 50 at location 70. Ball bearing 62 provides a rolling bearing surface for drum 30 from fixed cylinder 50. The drum 30 is thus mounted for rotation between ball bearing 62 on the right and bearing block 40 on the left, as viewed in FIG. 8.

Figure 11:
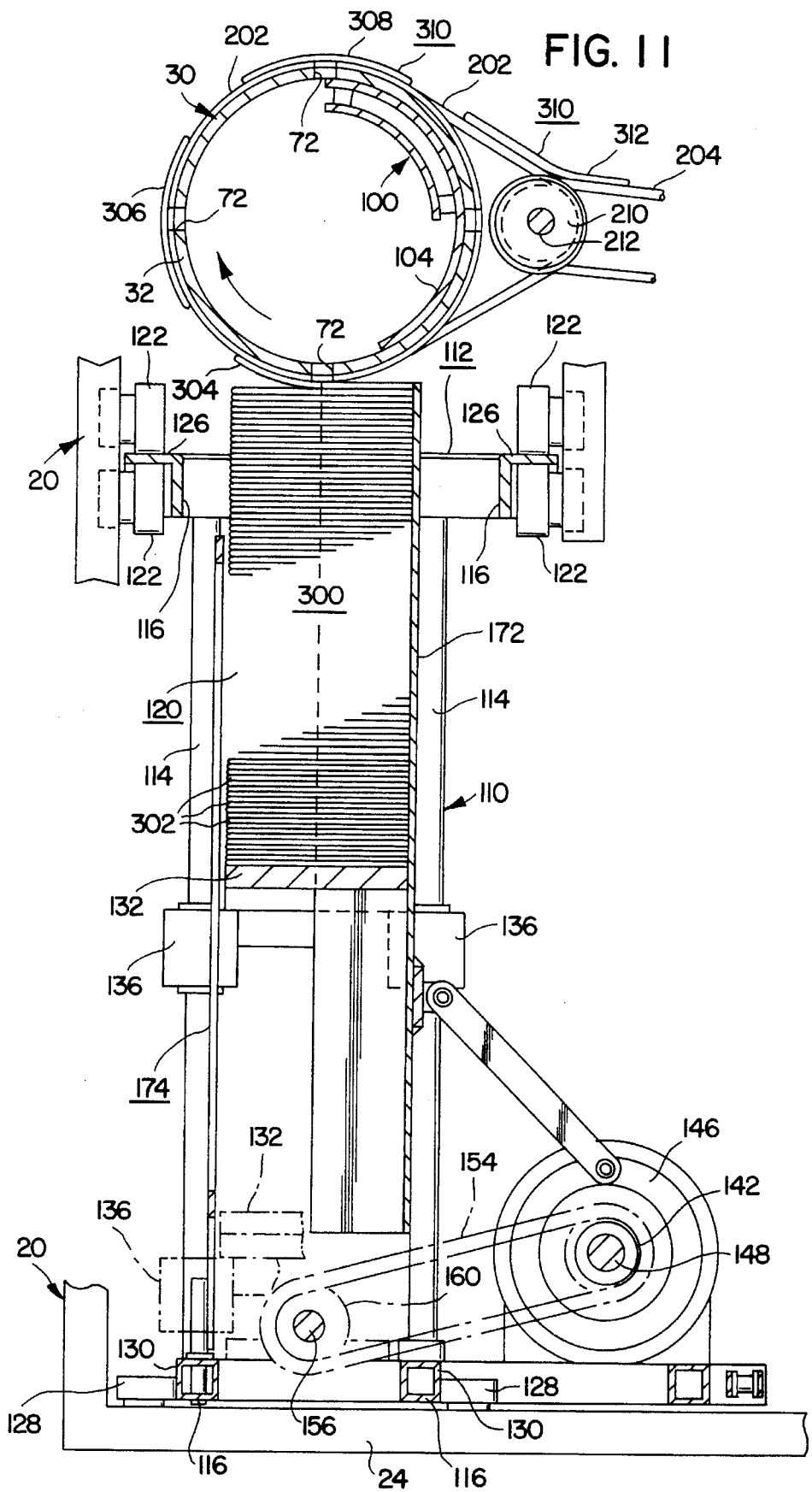
FIG. 11 is an enlarged fragmentary sectional elevational view taken on the line 11,11 of FIG. 2.

The rotating drum 30 has therein through cylinder wall 32 a series of holes 72. The holes 72 are intended to, through a vacuum, secure to the surface of drum 30 a food product such as a tortilla which is essentially a flat, flexible disk of baked dough. A set 74 of holes 72 for a 5" diameter tortilla consists of two rows; one of two and one of three. As seen in FIG. 11, drum 30 rotates in a clockwise direction. In the design of holes, the row of two in a set of holes 74 is ahead of the row of three in the rotation of drum 30.

The holes are, for instance when the drum 30 is being used with a 5" diameter tortilla, ¾" in diameter and are set on 1½" centers. The first and second row are desirably 1½" apart.

As seen particularly in FIG. 8, there are four sets 74 of holes 72, spaced longitudinally on the drum. The sets 74 are spaced equidistant from the ends of the drum 30 and from each other. There are four rows of sets 74 of holes 72 spaced circumferentially about the drum 30 at 90° angles on the surface thereof. Thus, there are, desirably, 16 sets 74 of holes 72 equally spaced longitudinally and circumferentially on the drum.

A suction fan assembly 80 is connected to fixed hollow open-ended cylinder 50 at 82. The assembly consists of a connecting duct 84 and a suction fan 86 driven by an electrical motor 88 which in turn is controlled from a control panel 90 having suitable controls, electrical connections and logical circuits contained in boxes 94. Connecting duct 84 is suitably rectangular in cross section, having a cross-sectional area of fixed hollow open cylinder 50 and drum 30 in order to avoid turbulent air flow. Duct 84 connects at the top thereof as seen particularly in FIGS. 1 and 4 to the inlet side of centrifugal fan 86 which creates a suction within the interior of drum 30. The suction created should be a suction capable of quickly picking up and firmly holding a tortilla. Fan 86 exhausts through outlet 96.

As shown in FIG. 8, suction cutoff mechanism 100 periodically closes certain holes 72 from any air movement and hence suction extends in the manner shown by arrows within rotating drum 30. The mechanism is shown particularly in FIGS. 8 through 11, inclusive, and consist of a fixed longitudinally extending curved support arm 102. Support arm 102 extends from within fixed hollow open-ended cylinder 50 to which it is welded, into interior of rotating drum 30, longitudinally therein. The curvature of support arm 102 as viewed for instance in FIGS. 9 through 11 inclusive conforms to the curvature of drum 30 adjacent to the interior surface of the drum. A suction cutoff plate 104 is fixedly supported from arm 102 through spacers 106.

Plate 104 extends as seen in FIGS. 9 and 11 through slightly less than 180° beginning at the topmost or 12:00 o'clock position and extends circumferentially within the drum to an approximately 5:00 o'clock position. Plate 104 can be of stainless steel or the like or permissibly of a rigid plastic which would permit a sliding relationship between plate 104 and the interior of drum 30. As drum 30 rotates in a clockwise direction as seen in FIG. 9, suction cutoff plate 104 which is stationary, sequentially cuts off any suction to the holes 72 which are passing over the plate 104. As the holes emerge from the 5:00 o'clock position at the lower end of the plate, suction is again applied through the holes 72.

Feed mechanism 110 is slidably supported within frame 20. The feed mechanism 110 itself has a frame 112 having vertical supports and horizontal members 116. Feed mechanism frame 112 is in the form of a box which extends beneath and parallel to the longitudinal axis of drum 30. As viewed in FIG. 2, the feed mechanism 110 shuttles left and right between the slide position wherein the right magazine 120 is feeding the drum 30 to a dotted position where a left magazine is feeding the drum. Feed mechanism box frame 112 is slidably supported from main frame 20 by rollers 122 journalled in uprights 22. The rollers 122 extend in pairs, one above another, as seen particularly in FIGS. 2 and 11. The rollers 122 support the horizontal leg of angle 126 which is one of the horizontal members 116 of the frame. Rollers 122 along with rollers 128 which abut lower box members 130 at the bottom of the frame, in effect box frame 112, hang from rollers 122. Rollers 128 guide the roller end of the box horizontally. Within box frame 112 there extend vertical members 114. In addition to forming structural components of the box frame, they act as guides for elevator platens located within magazines 120 and 118 respectively.

Figure 3:
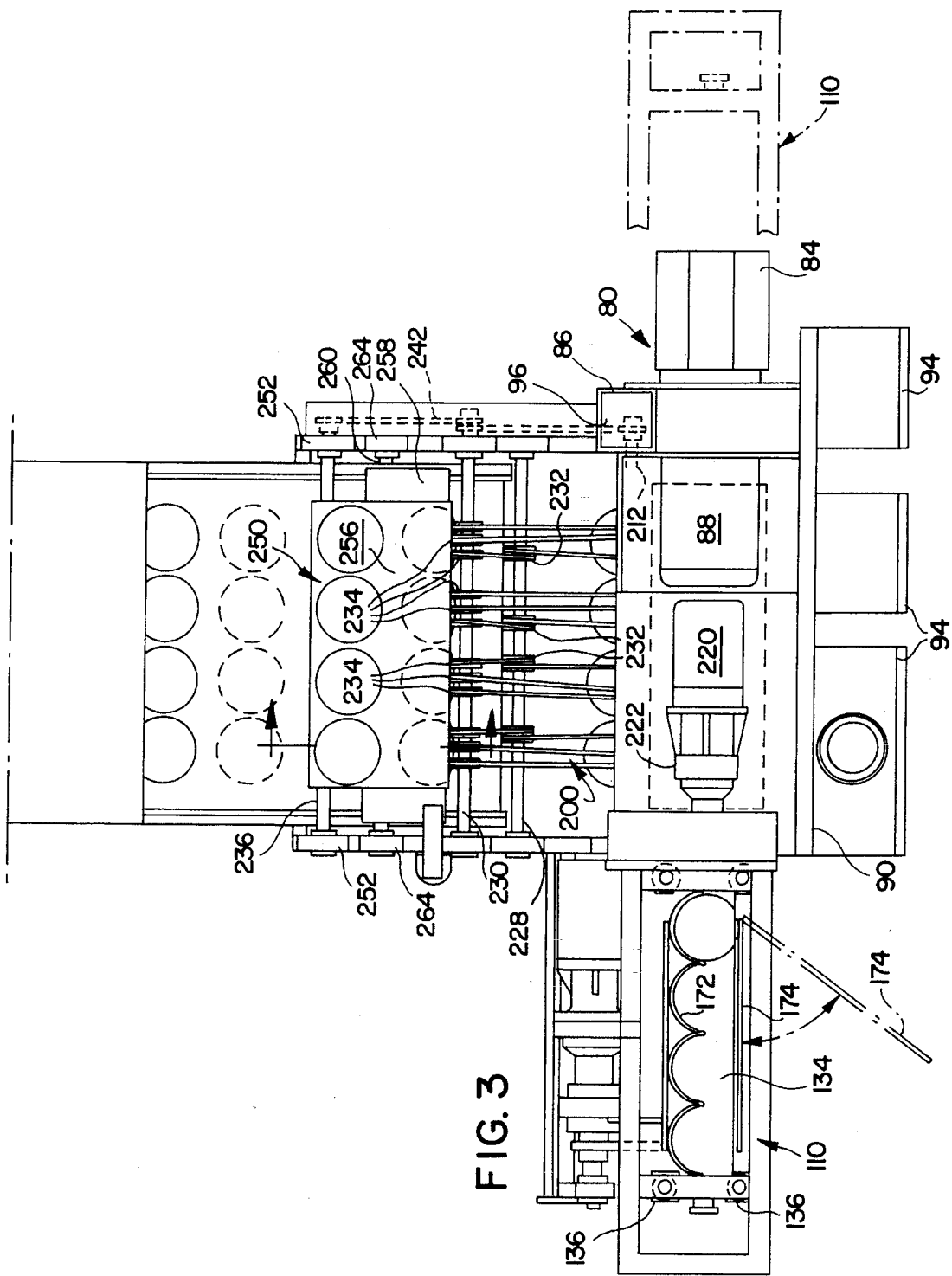
FIG. 3 is a plan view of the device shown in FIG. 2.

Elevator platen 134 is rectangular in plan view as seen in FIG. 3 and has at each of its corners a guide bearing 136 which journals on vertical members 114 of box frame 112.

Bearing block 136 and elevator platen 134 are desirably integral.

Elevator platen 132 and support therefore is identical to elevator platen 134 and has the same bearing blocks 136 as described above. As seen in FIG. 2, elevator platen 132 is free to ride vertically on vertical members 114, as is elevator platen 134 in magazine 118.

Figure 7:
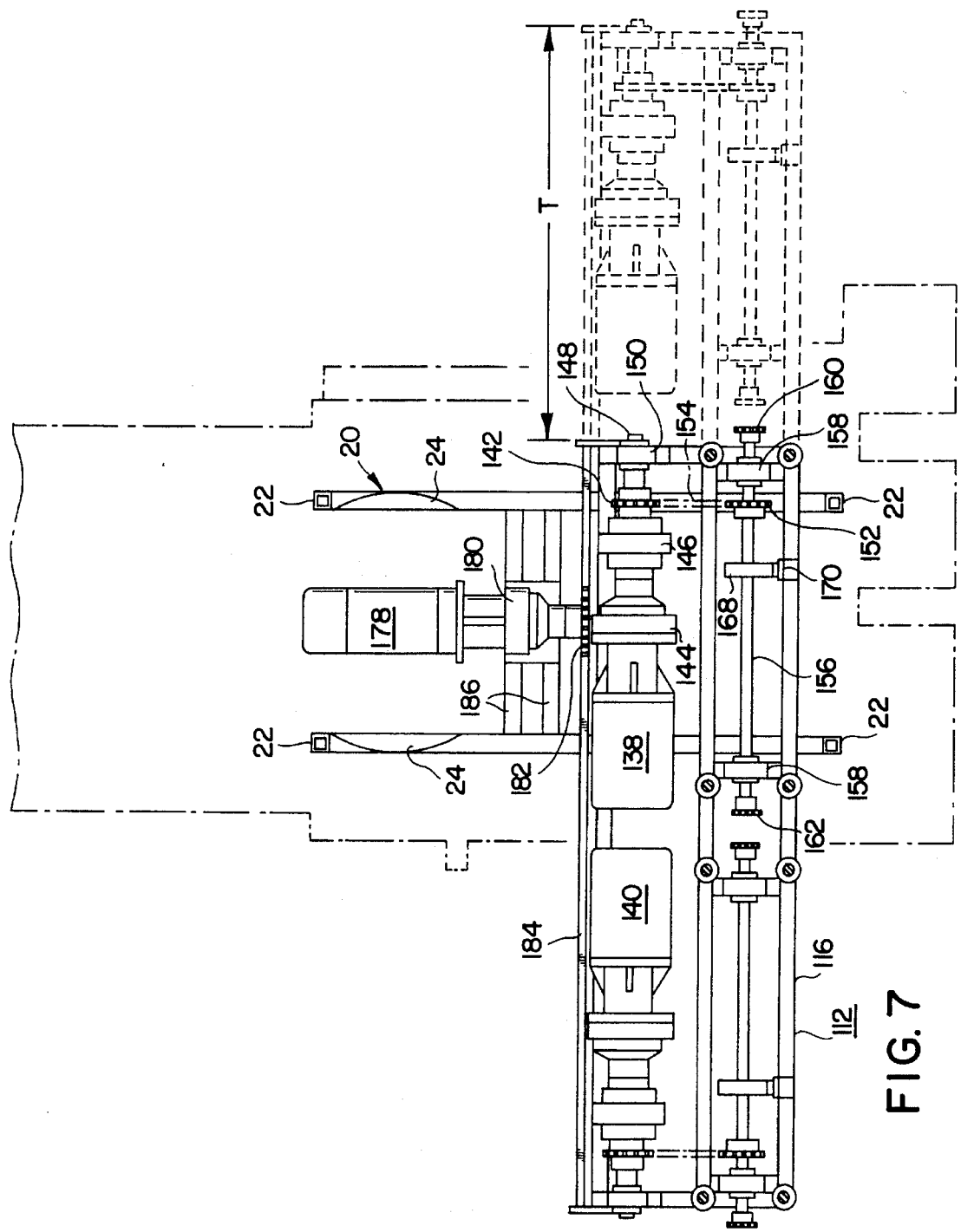
FIG. 7 is a sectional plan view taken on the line 7,7 of FIG. 2, showing details of the magazine shuttle drive mechanism and the two independent driving means for raising or lowering the platen in each of the magazines.

Magazine 120 has a similar elevator drive arrangement with respect to FIG. 7 for elevator platen 132. Friction drag 168 of a suitable friction material in the form of a wheel keyed on the shaft engages adjustable stop 170 to provide drag to maintain the elevator platen 132 at its position when motor 138 is de-energized, particularly when the magazine is weighted with product.

Platens 132 and 134 respectively are driven from separate drive motors 138 and 140. Motor 138 drives sprocket 142 through gear reducer 144 and clutch 146 mounted on shaft 148 which is journalled in bearing 150 horizontally fixed on box frame member 116.

Figure 4:
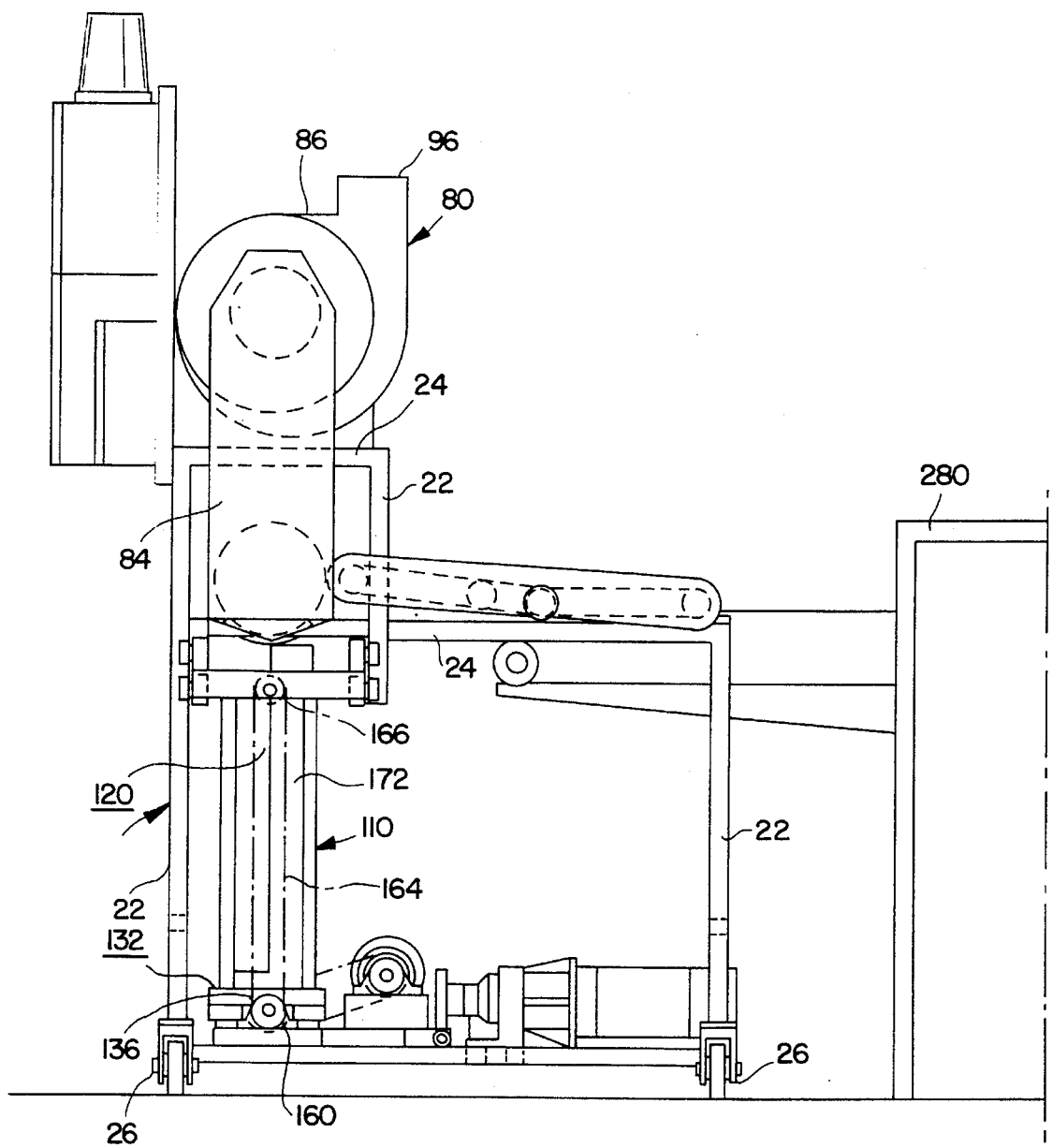
FIG. 4 is a right side elevational view of FIG. 2.
Figure 5:
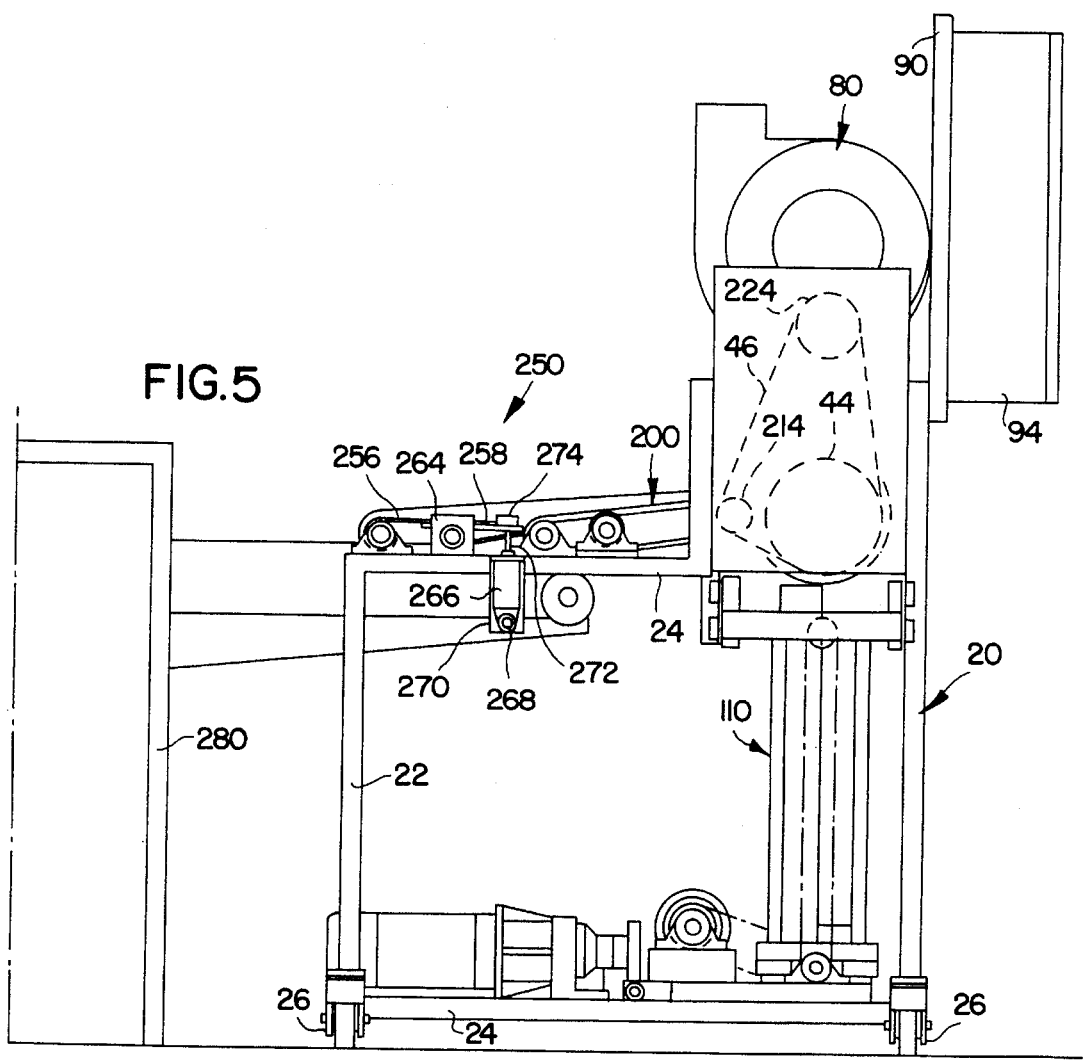
FIG. 5 is a left side elevational view of FIG. 2.

Sprocket 142 drives sprocket 152 through roller chain 154. Sprocket 152 is keyed on shaft 156 journalled in bearings 158 fixed in the box frame 116. Sprockets 160 and 162 engage a roller chain 164 as seen in phantom in FIGS. 4 and 5 in dot-and-dash line. Chain 164 extends over upper sprockets 166. Sprocket 162 has a similar chain and upper sprocket arrangement. Elevator platen 132 is secured to the chains 164 at one point 136 as seen in FIGS. 2, 4 and 5.

Each magazine 118 and 120, respectively, has therein a series of semi-circular chutes 172 extending vertically, as best seen in FIG. 3. Such chutes—four in number—are formed of a light metal, desirably of stainless steel for sanitary purposes, which conforms to the diameter of the food product which will be stacked within the magazines. The chutes 172 are fixed vertically within box frame 112 in each of the magazines 120 and 118. There is suitable clearance allowed at the bottom for chain drive 154. Platens 132 and 134 respectively are free to rise and fall without interference with or from the chutes 172.

A gate 174 extends across the front of each of the magazines and is formed in effect of a vertical enclosed grid. The gate is suitably hinged on one side as at 176. The gate is open when loading stacks of product into the magazine.

Feed mechanism 110 is shuttled back and forth as seen in FIG. 2 to introduce magazines loaded with stacked product. When one magazine for instance 120 is being unloaded as seen in FIG. 2, magazine 118 is ready for reloading. To shift back and forth, a reversing shuttle drive motor 178 drives box frame 112 through gear reducer 180 and sprocket 182 which engages horizontally extending roller chain 184 which is, in effect, a rack. Motor 178 is mounted to main frame 20, as best seen in FIG. 7, through main frame supports 186. Hence, it is clear that there is relative movement between main frame 20 and feed mechanism box frame 112 by virtue of reversing drive motor 178 fixed on main frame 20. Suitable controls and limit switches activate reversing drive motor 178.

Take-off belt assembly 200 includes a first group of belts 202 and a second set of takeoff belts 204. Belts 202 are arranged in a series of three which overlap a set of holes 74 in the cylinder 32 as seen for instance in FIG. 8. The drum has three concentric grooves 206 which are longitudinally spaced over each set of holes 74. The grooves are at a depth to accommodate belt 202, desirably synthetic, of circular cross section wherein the belt is buried within the surface of the cylinder 32 so that only a very slight projection remains above the cylinder surface. Belt 202 as seen for instance in FIG. 9 is endless in length and surrounds cylinder 32 and takeoff twin pulley 210. Take-off pulley 210 is keyed on shaft 212 which has keyed at the end thereof sprocket 214 as best seen in FIG. 8.

Shaft 212 is journalled in bearing 216 mounted on horizontal frame member 24. Shaft 212 is journalled at its opposite end on the frame in the same manner.

The first group of belts 202 is arranged three to a set as shown best in FIG. 8, with four sets distributed on shaft 212 so that each set of holes 74 is suitably embraced by a group of three belts.

Both rotating drum assembly 30 and takeoff belt assembly 200 are driven from motor 220 through gear reducer 222. Sprocket 224 is keyed to the shaft of gear reducer 222. A roller chain 46, endless in length, drives sprockets 224, 44 on the cylinder 32 and sprocket 214 and are such that the linear speed on the circumference of each of the sprockets is the same.

Extending parallel to shaft 212 are takeoff belt shafts 228 and 230, having twin pulleys 232 and single pulleys 234 respectively. Takeoff belts 204 extend between the twin pulleys 210 on shaft 212 and the twin pulleys 232 and single pulleys 234 mounted on the shafts 228 and 230. The group of belts 204 are also in four sets of three. One belt 204 of each set passes about twin pulleys 232, and a fourth belt 240 passes between twin pulleys 232 and single pulleys 234. The other two belts 204 of each set pass directly between twin pulleys 210 and single pulleys 234.

A third shaft 236 is also mounted parallel to the other shafts 212, 228 and 230 and drives the vane directed conveyor of the diverter conveyor. Each of the shafts 212, 228, 230 and 236 mount sprockets and are driven by chain drive 242 via shaft 212. The belts in the second series 204 slightly converge as viewed in FIG. 3 in plan to transport the products closer laterally in the progress of the products.

Figure 6:
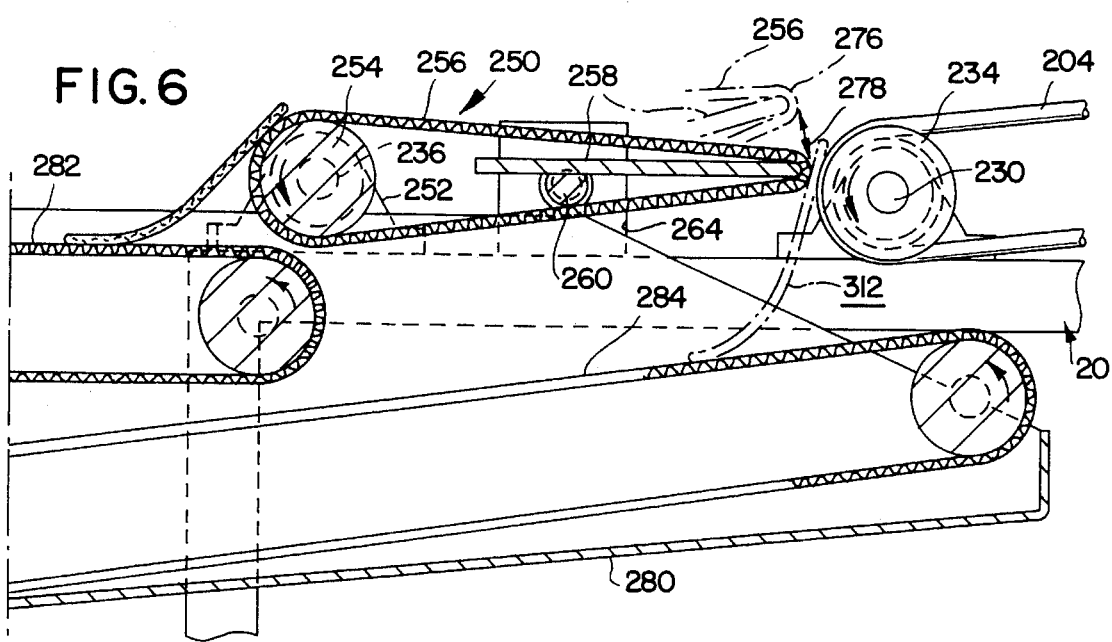
FIG. 6 is a greatly enlarged fragmentary sectional elevational view taken on the line 6,6 of FIG. 3, showing details of the vane operated intermediate conveyor used to alternatively direct incoming tortillas to either an upper or lower conveyor of the fryer assembly.

A diverter assembly 250 as seen in FIGS. 3, 5 and 6 has therein shaft 236 as earlier described, journalled in bearings 252. Shaft 236 is driven by roller chain 242. Cylinder 254 is keyed to the shaft 236 which extends laterally across the shaft to support endless belt conveyor 256. A vane 258 is fixed on shaft 260 as by welding. Shaft 260 oscillates in bearings 264 fixed in frame 20.

Belt 256 extends over cylinder 254 into the leading edge of vane 258 at 264. Desirably, the material is of a slippery nature such as a teflon-coated material. An air cylinder 266 as seen in FIGS. 3 and 5, pivotally mounted at 268 to a bracket 270 fixed in frame 20, has extending therefrom an actuator rod 272 connected to vane 258 through extension 274. Air cylinder 266 is activated by a timer mechanism through controls 92 in control panel 90.

The air cylinder 266 is activated to oscillate vane 258 about shaft 260 to periodically raise the leading edge of conveyor 256 to an upper position as shown at 276 and a lower position as shown at 278.

There is also shown, particularly in FIGS. 5 and 6, a portion of a fryer 280 having an upper metallic conveyor belt 282 and a lower metallic conveyor belt 284. These belts carry a product downwardly into a vat of hot oil to fry the product.

The operation of the device of the invention will be described using a stack of tortillas, but it should be understood the invention can be applied to any flexible planar stacked product, including but not limited to food products.

A stack 300 of individual tortillas 302 extends in each of the arcuate chutes 172 in each of the magazines at 118 and 120 of the feed mechanism 110. As viewed in FIG. 2, feed mechanism 110 is shifted to the left to expose left magazine 118 to loading while right magazine 120 is being unloaded. In the unloading process, stacks 300 of individual tortillas 302, one stacked on top of another, extend in chutes 172. The stacks 300 rest on elevator platen 132 which is being lifted upward by roller chain 164, at a speed coordinated with rotation of drum 30 which is consistently removing from the top of the stack the topmost tortilla.

As the drum 30 rotates, a suction created by Exhaust fan 86 creates air movement through, and suction at, holes 72 in cylinder wall 32. As the first two holes in line in a given set 74 of holes approaches the top of the tortilla stack 300, the topmost tortilla 304 is suctioned up, and lifted, against the rotating drum 30 as seen best in FIGS. 9 and 11. The tortillas are carried with the rotating drum 30 on the surface thereof as seen at 306. As the drum 30 rotates and a given tortilla comes to the top of the cylinder as seen at 308 in FIGS. 9 and 11, the suction cutoff mechanism 100 comes into play. Plate 104 blocks any air flow or suction through set 74 of holes that is now passing over plate 104, thus releasing any grip on the topmost tortilla 310 which then is carried away by takeoff assembly 200.

The first set of belts 202 carries the tortilla 310 to a position 312 as seen in FIG. 11. It then progresses onto the second set of belts 204. Drum 30 continues to rotate, with the suction cutoff to the sets 74 of holes adjacent to plate 104. As a given set 74 of holes emerges from the lower portion of plate 104 as the drum 30 rotates, suction through these emerging holes 74 creates a gripping action on the topmost tortilla 304 of the stack.

In practice, the suction is such that it will grip a tortilla which is approximately ½" below the rotating cylinder 32 so that upward speed of elevator platen 132 is coordinated through controls 92 and 94 to maintain such upward travel and stack feed to the rotating dram 30, maintaining this distance of the uppermost tortilla with respect to the bottom of the drum 30.

As seen in FIG. 2, each series of holes 72 grips one tortilla from a corresponding chute 172 whereby four tortillas are carried over and released onto the takeoff belt mechanism 200.

While the magazine 120 is being unloaded as described, magazine 118 is free to be reloaded.

Gate 174 is opened and stacks 300 of tortillas are handplaced into the individual chutes. The elevator platen 134 has been locked automatically when the feed mechanism 110 was shifted from the phantom position shown in FIG. 2 to the solid position shown.

The feed mechanism 110 is shifted by either manually actuating a switch in controls 92 or automatically by virtue of a trip switch which is activated when the platen 132 leaves the topmost position.

In shifting a position of the feed mechanism 110 after magazine 118 has been filled, reversing shuttle drive motor 178 is activated after magazine 120 is emptied.

Motor 178 through gear reduction 180 rotates sprocket 182 which engages roller chain 184 so that when viewed from above in FIG. 7, the feed mechanism is driven to the right from the full line designation into the dotted line designation. A logic-limited switch stops reversing shuttle drive motor 178 when the feed mechanism 100 travels through a distance T as shown in FIG. 7. In this position, chutes 172 are aligned with the series of holes 72 so that a given chute 172 is aligned with a given series of holes 72.

Optionally, the diverter mechanism 250 as shown in FIGS. 3, 5 and 6 is used. Such use occurs when it is desired to alternatively or selectively position tortillas onto an upper belt 282 and a lower belt 284. Use of such upper and lower belts often occurs for increasing production through a vat fryer as is well known.

In operation, air cylinder 266, through controls 92, is suitably activated to alternatively raise and lower the vane 258 to a position 276 and a position 278. In the upper position 276, a tortilla 312 is free to drop onto the lower belt 284 whereas when the vane 258 is in the lower position at 278, the tortilla is carried to the upper belt 282. The vane movement is so timed that rows are alternatively shifted to the upper and lower position.

By use of the casters 26 as shown, the entire mechanism described above can be optionally rolled into position on an assembly line without interrupting the normal procedure of the line, and without any mechanical interconnection.

An optional display light connected through suitable controls and trip switches indicates when a magazine being unloaded is empty.

Figure 12:
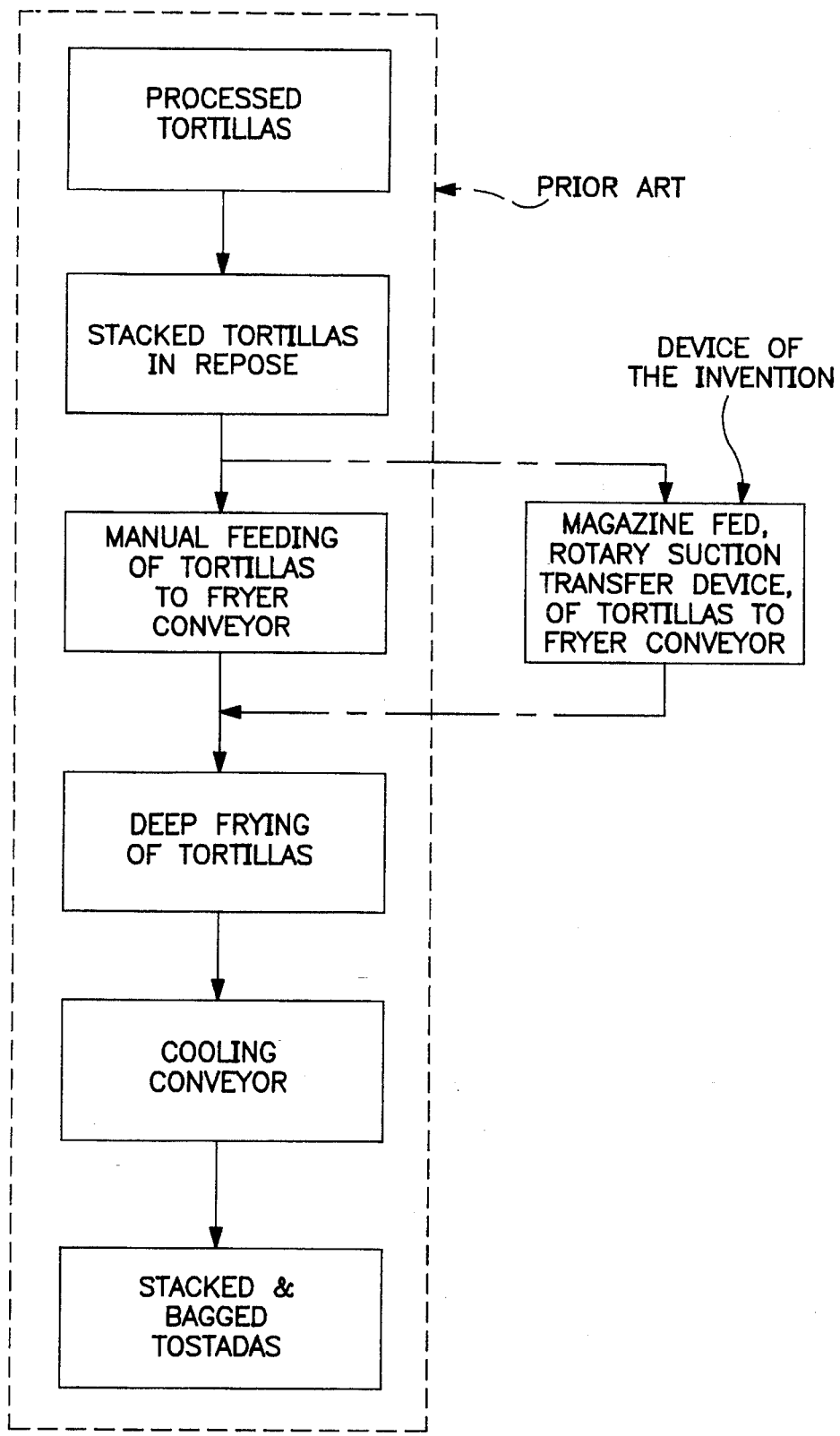
FIG. 12 is a block diagram showing the sequential steps for the processing of tortillas into tostadas and the stage in the process where the device of the invention may be optionally inserted in accordance with the invention.

There is shown in FIG. 12 in block diagram form where, for instance, the device can be used, by way of an example, in a prior art product line. As seen within the block lines, there is set forth in block diagram form the prior art relating to the steps involved in the production of tortillas.

As can be seen from the designated blocks, fully processed tortillas are stacked and placed in trays, to permit the tortillas to repose and for the moisture to suitably migrate. The stacks of tortillas are then manually fed to a fryer conveyor where they are deep fried and then cooled, after which they are stacked and bagged.

The device of the invention can be optionally inserted at the place shown to replace manual feeding of the tortillas. The detailed description as set forth above shows how this is done. In the event it is necessary to repair or otherwise maintain the device of the invention, the entire structure can be rolled out on casters 26 as set forth above and then suitably rolled back into line after the maintenance or repairs are completed. Meanwhile, the tortillas can be fed manually.

What is claimed is:

1. A device for repetitively removing individual thin, flat, flexible articles from a stack of such articles and depositing said articles individually and separately on a moving conveyor belt, which comprises:

suction means for individually removing the topmost article in a stack of articles;

means for transporting and depositing said articles individually and separately onto a first supporting surface adjacent said suction means including:

a) a continuously rotating cylindrical drum, the wall of which has at least one hole therethrough;

b) means creating suction through said hole;

c) means for cutting off suction through said holes including a curved plate;

d) in which said first supporting surface includes at least one belt extending around and rotating with said drum and which transports said articles to a second supporting surface; and wherein e) said second supporting surface is a moving conveyor belt on which said articles are deposited individually and separately; and wherein said articles are flexible and fragile and are deposited onto the at least one belt extending around and rotating with said cylindrical drum;

said belt or belts extending beyond said drum and conveying said articles onto the second supportive surface which comprises said moving conveyor belt;

at least one means for receiving a stack of thin, flat, flexible articles and conveying said articles into proximity with said holes on said rotating cylindrical drum, whereby the topmost article in said stack of articles is lifted and picked up by said suction and carried by said drum to said belt or belts extending over the rotating drum and thenceforth onto said second supportive surface which comprises said moving conveyor belt;

wherein the holes are in sets, each set being within an area less than the area of the article;

wherein the belt or belts are in contact with the drum but arcuately removed from the curved plate;

wherein the curved plate extends substantially the length of the drum wall and arcuately for not more than about one-half of the inner circumference of the wall.

2. A device for repetitively removing individual thin, flat, flexible articles from a stack of such articles and depositing said articles individually and separately on a supportive surface, which comprises:

suction means for individually removing the topmost article in a stack of articles;

means for transporting and depositing said articles individually and separately onto a first supporting surface adjacent said suction means including:
 a) a continuously rotating cylindrical drum, the wall of which has holes therethrough;
 b) means creating suction through said holes;
 c) means for cutting off suction through said holes including a curved plate;
 d) in which said first supporting surface includes at least one belt extending around and rotating with said drum and which transports said articles to a second supporting surface; and wherein
 e) said second supporting surface is a moving conveyor belt on which said articles are deposited individually and separately; and wherein said articles are flexible and fragile and are deposited onto said at least one belt extending around and rotating with said cylindrical drum;

said belt or belts extending beyond said drum and conveying said articles onto the moving conveyor belt;

also including at least one means for receiving a stack of thin, flat, flexible articles and conveying said articles into proximity with said holes on said rotating cylindrical drum, whereby the topmost article in said stack of articles is lifted and picked up by said suction and carried by said drum to said belt or belts extending over the rotating drum and thenceforth onto said moving conveyor belt;

wherein the holes are in sets, each set being within an area less than the area of the article;

wherein the belt or belts are in contact with the drum but arcuately removed from the curved plate;

wherein suction is successively permitted and then cut off through a given set of holes as the drum is rotating;

wherein said given set of holes comprises five holes, set in two rows of two and three holes respectively, with the row of two holes contacting the article before the row of three holes; and said belt or belts rotate with and pass around the drum over said given set of holes.

3. The device of claim 2 wherein the belt or belts are depressed, within grooves in the drum, whereby an article can be held on the drum surface over the belts by suction through the holes.

4. A device for repetitively removing individual thin, flat, flexible articles from a stack of such articles and depositing said articles individually and separately on a supportive surface, which comprises:

suction means for individually removing the topmost article in a stack of articles;

means for transporting and depositing said articles individually and separately onto a first supporting surface adjacent said suction means including:
 a) a continuously rotating cylindrical drum, the wall of which has at least one hole therethrough;
 b) means creating suction through said hole;
 c) means for cutting off suction through said holes including a curved plate;
 d) in which said first supporting surface includes at least one belt extending around and rotating with said drum and which transports said articles to a second supporting surface; and wherein
 e) said second supporting surface is a moving conveyor belt on which said articles are deposited individually and separately; and wherein said articles are flexible and fragile and are deposited onto at least one belt extending around and rotating with said cylindrical drum;

said belt or belts extending beyond said drum and conveying said articles onto a second moving conveyor;

also including at least one means for receiving a stack of thin, flat, flexible articles and conveying said articles into proximity with said holes on said rotating cylindrical drum, whereby the topmost article in said stack of articles is lifted and picked up by said suction and carried by said drum to said belt or belts extending over the rotating drum and thenceforth onto said second moving conveyor;

wherein the holes are in sets, each set being within an area less than the area of the article;

wherein the belt or belts are in contact with the drum but arcuately removed from the support member;

wherein the topmost article in a stack beneath the drum is, through a given set of holes in the drum:
 a) lifted onto the cylindrical wall of the rotating drum at the bottom thereof by suction;
 b) held and carried on the drum's cylindrical wall during the rotating of the drum by suction;
 c) released from the drum after passing over the top thereof when the curved plate cuts off suction; and
 d) carried away from the drum by the belt or belts;

wherein the belts carry an article released from the drum, through said cutoff of suction through the holes away from the drum to a surface remote from the drum;

wherein said surface remote from the drum is a conveyor taking the articles to a further processing operation;

including means for alternatively diverting said articles to one of at least two separate conveyor belts;

wherein the diverter means comprises:
 a) an endless belt,
 b) means for driving the belt, and
 c) a pivotal vane that journals on one end of the endless belt, the endless belt can be intermittently positioned to receive a topmost article from the belt or belts which extend from beyond the rotating drum;

wherein the vane is pivoted to deflect one end of the endless belt into an upper and a lower position, whereby a first article is received on the endless belt, and a second article is permitted to pass free of the endless belt.

5. In an apparatus for unstacking tortillas in combination, on a main frame:

a) a driven hollow continuously rotating drum having a cylindrical wall with holes therein for contacting a topmost tortilla in a stack of tortillas and lifting and holding the topmost tortilla to the drum wall by suction through the holes;

b) a suction fan assembly for creating such suction;

c) a suction cutoff mechanism for cutting off suction to certain holes in the drum while permitting suction through other holes;

d) a feed mechanism for feeding a stack of tortillas to the drum; and e) a takeoff belt assembly for taking tortillas from a surface of the continuously rotating drum to a surface remote from the drum;

wherein the suction fan assembly has a suction fan and a duct connected to the interior of the rotating drum; and wherein said duct has a cross section substantially as large as that of the drum, whereby turbulent air flow is avoided.

6. The apparatus of claim 5 wherein the duct includes a fixed open-ended cylinder which forms an end bearing for the rotating drum wall.

7. The device of claim 6 wherein the takeoff belt assembly includes belts that are in radial or arcuate contact with the drum for not more than 180°.

8. The device of claim 7 wherein the belts are in contact with the drum arcuately removed from the drum wall adjacent the suction cutoff mechanism.

9. A device for repetitively removing individual articles from a stack of such articles and depositing said articles individually and separately on a supporting surface, which comprises:

a frame;

a rotating, hollow drum having a cylindrical wall pierced by a plurality of holes;

said drum having a closed end journaled to a drive mechanism and an open end journaled on a fixed hollow cylinder;

said drive mechanism and fixed hollow cylinder being mounted on said frame;

suction means connected to said fixed, hollow cylinder and communicating therethrough to said hollow rotating drum to provide suction therein through said holes without turbulent flow;

said suction within said drum acting through said holes to lift said articles individually from a stack of said articles disposed below said drum and to hold individual articles temporarily on the surface of said drum; and a suction cutoff mechanism for periodically closing certain of said holes in said drum to cut off suction therethrough and release said articles from said drum.

10. A device of claim 9, wherein said suction cutoff mechanism includes a longitudinally extending, curved support member extending from within said fixed hollow open-ended cylinder to which it is fixed and which supports a curved plate positioned adjacent to and conforming to an inner wall surface of said rotating drum to close certain of said holes.

11. A device of claim 10 wherein said curved plate extends through slightly less than 180° of the internal circumference of said drum from a point at an upmost 12:00 o'clock position to an approximately 5:00 o'clock position for sequentially cutting off the suction through those holes in the rotating drum which are passing the suction sources as the drum rotates.

* * * * *